Figure 1:
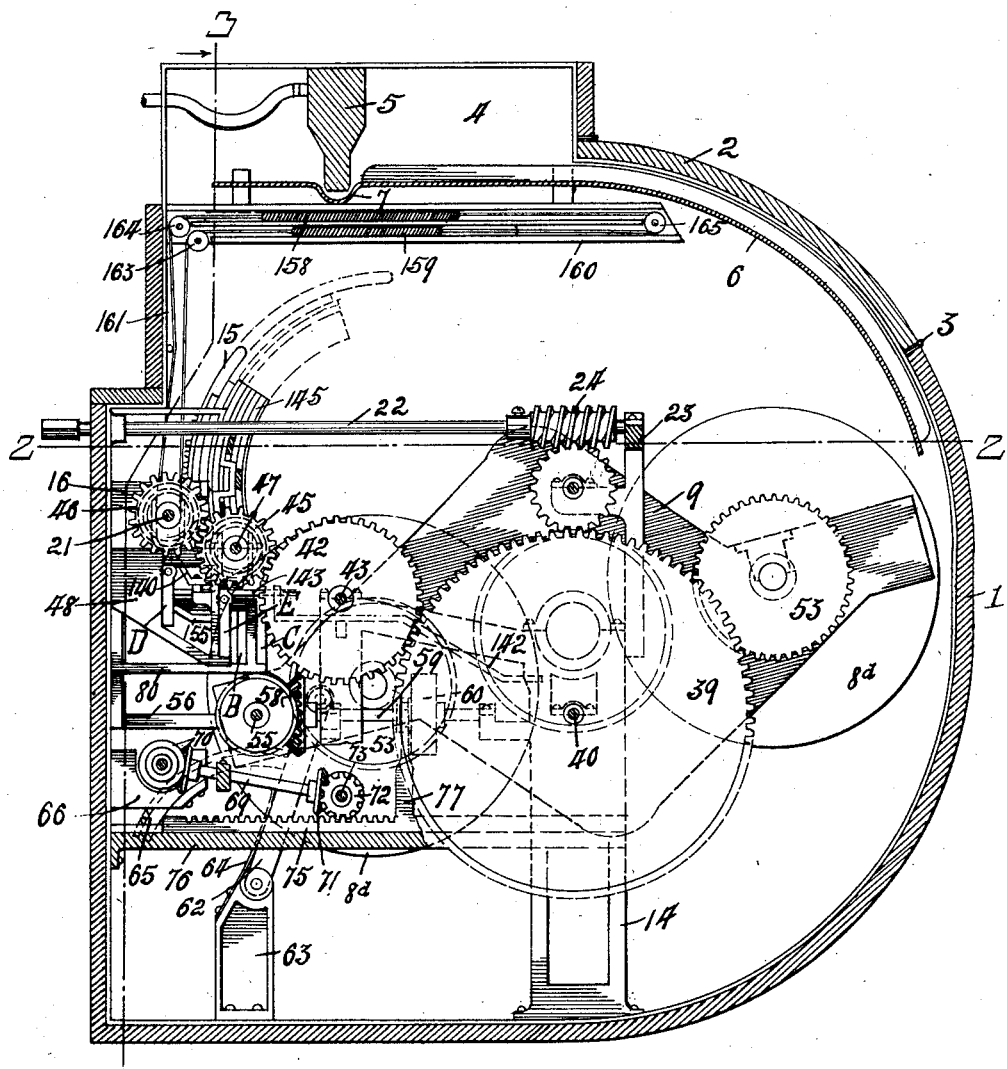

P. J. DREHER.
ENDLESS BELT OPERATING MECHANISM FOR AUTOMATIC PLAYERS.
APPLICATION FILED FEB. 10, 1911.

1,006,538.

Patented Oct. 24, 1911.
11 SHEETS—SHEET 1.

WITNESSES:
C. H. Bills.
M. E. Gaskell.

INVENTOR.
Phillip Jacob Dreher,
By Owen & Owen,
His attys.

P. J. DREHER.
ENDLESS BELT OPERATING MECHANISM FOR AUTOMATIC PLAYERS.
APPLICATION FILED FEB. 10, 1911.

1,006,538.

Patented Oct. 24, 1911.
11 SHEETS—SHEET 2.

WITNESSES:

INVENTOR.
Phillip Jacob Dreher,
By Owen & Owen,
His attys.

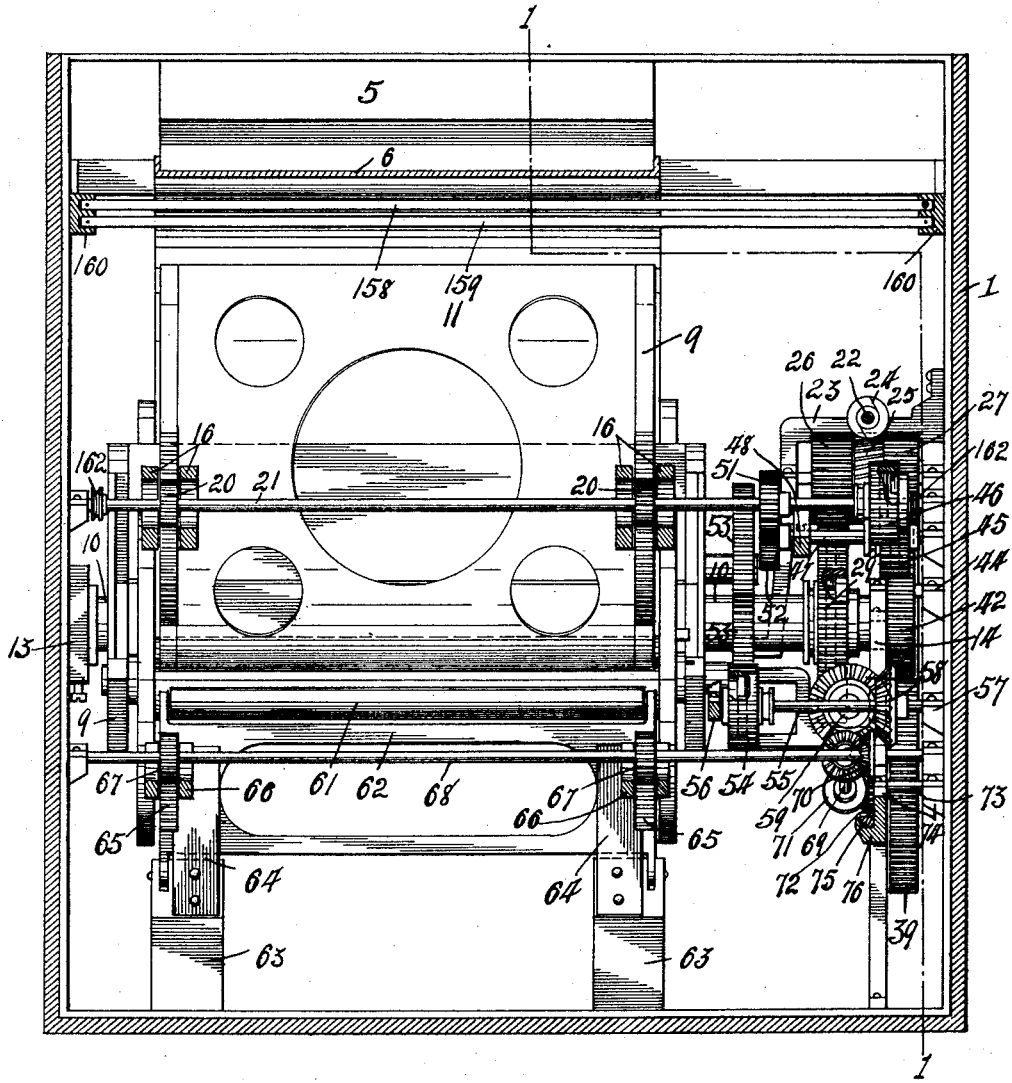

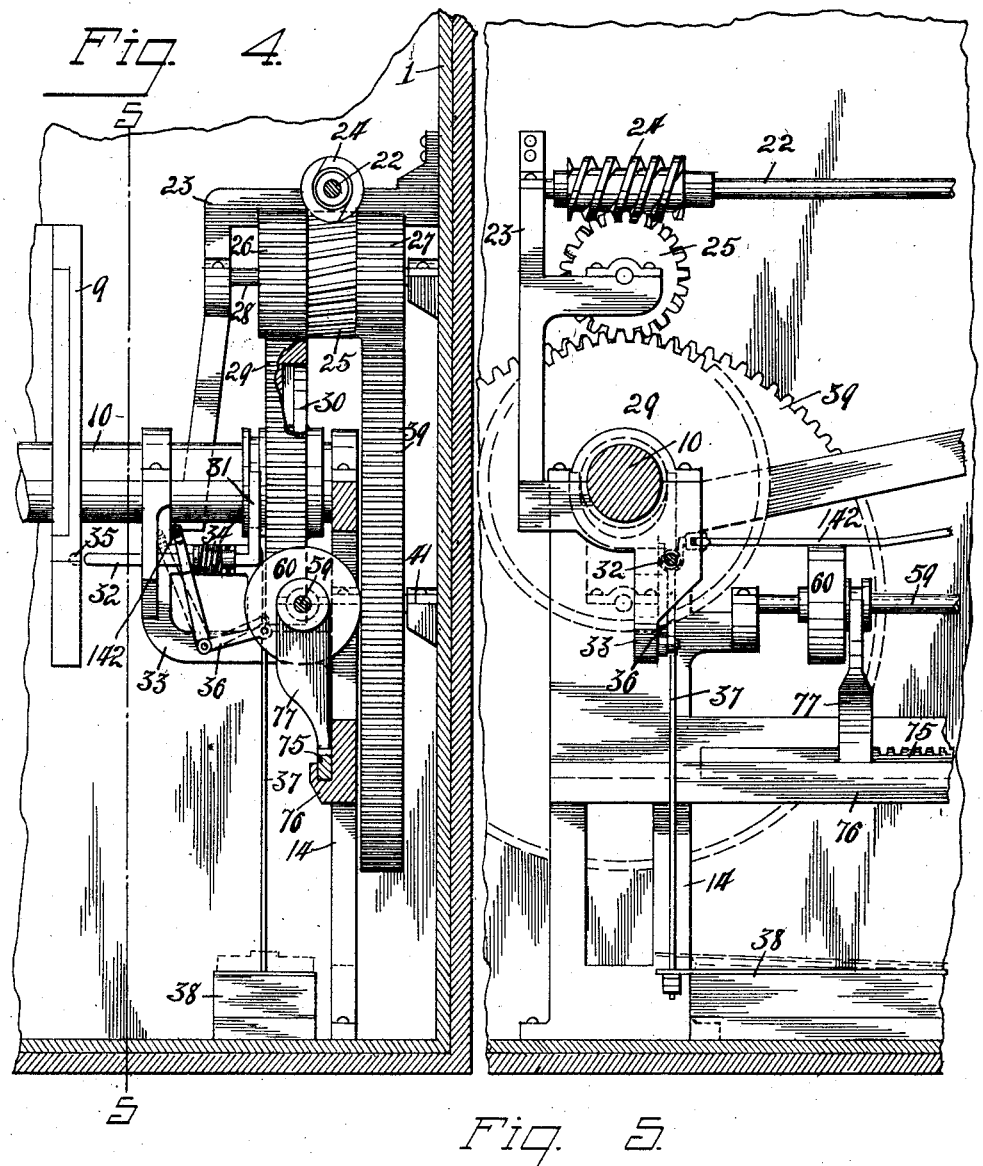

P. J. DREHER.
ENDLESS BELT OPERATING MECHANISM FOR AUTOMATIC PLAYERS.
APPLICATION FILED FEB. 10, 1911.
1,006,538.
Patented Oct. 24, 1911.
11 SHEETS—SHEET 5.
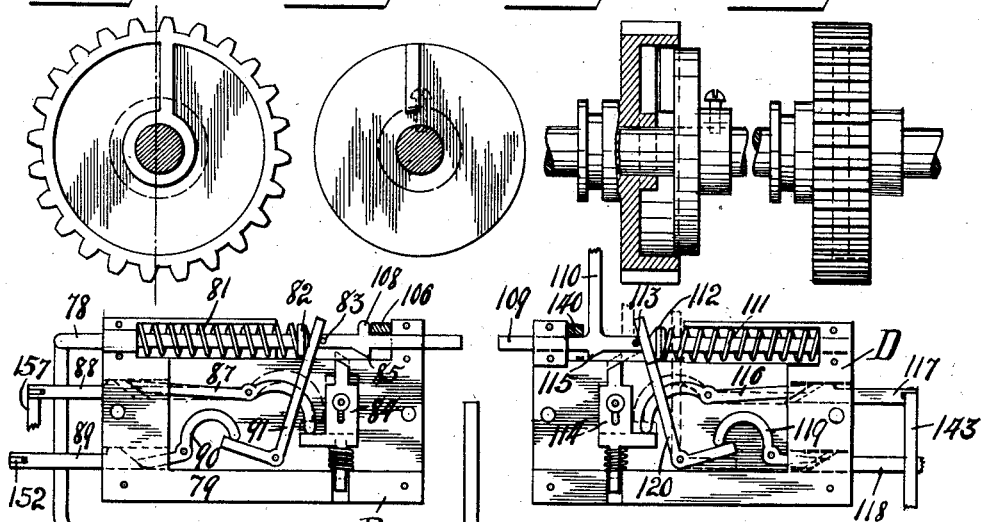
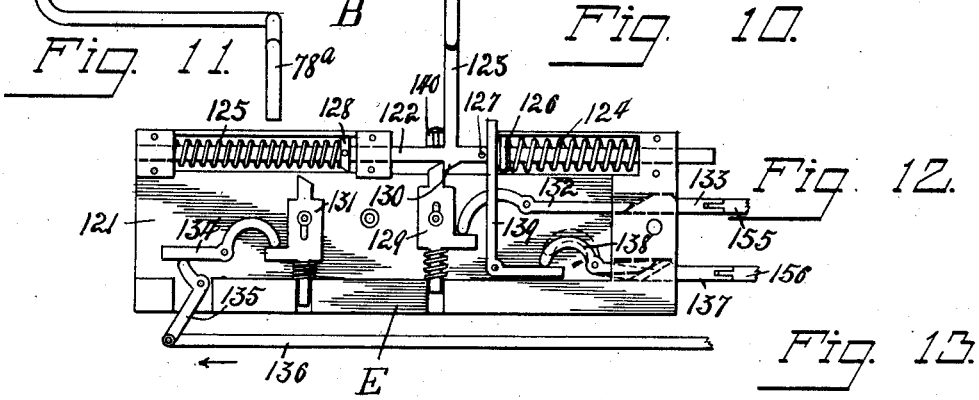
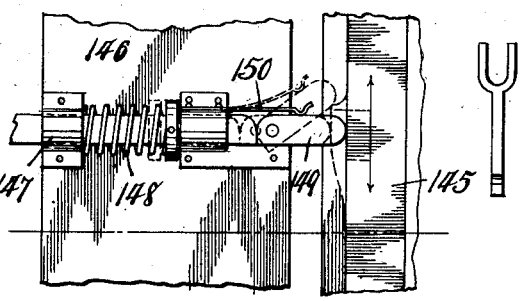
WITNESSES:
C. H. Bills.
M. Haskell.
INVENTOR.
Phillip Jacob Dreher,
By Owen & Owen,
His attys.

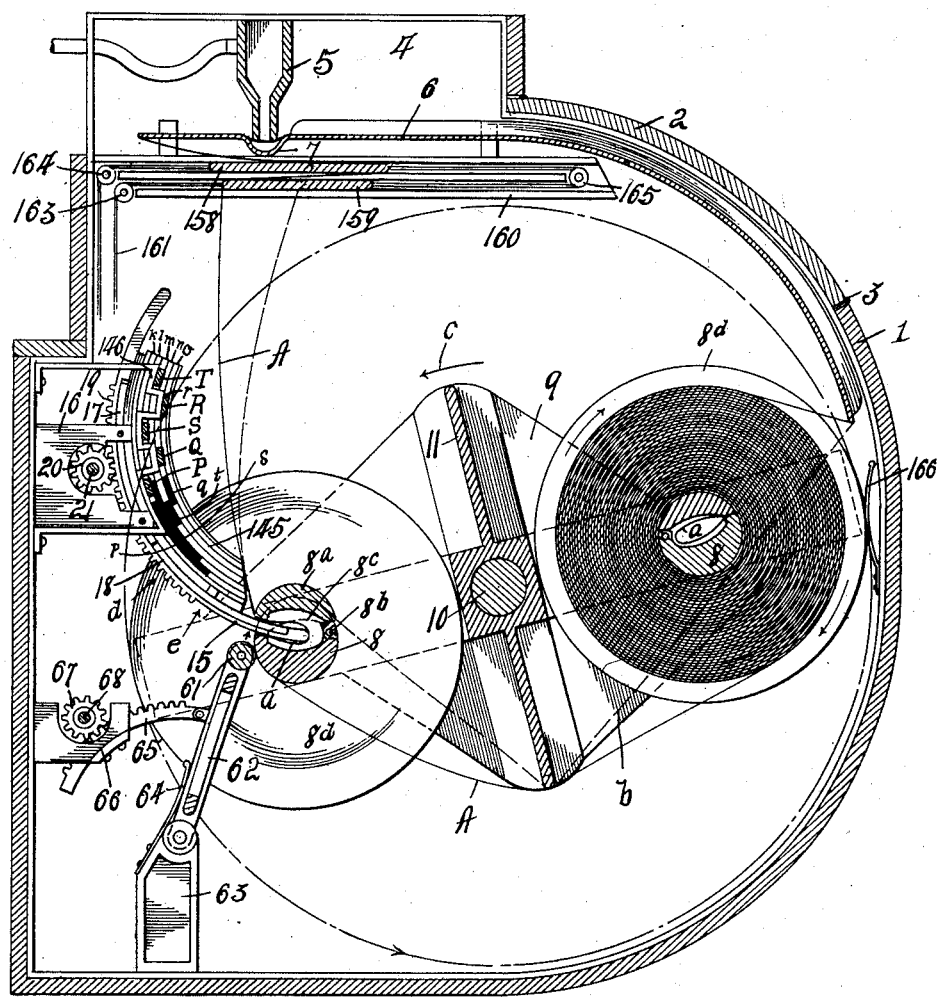

P. J. DREHER.
ENDLESS BELT OPERATING MECHANISM FOR AUTOMATIC PLAYERS.
APPLICATION FILED FEB. 10, 1911.
1,006,538.
Patented Oct. 24, 1911.
11 SHEETS—SHEET 7.
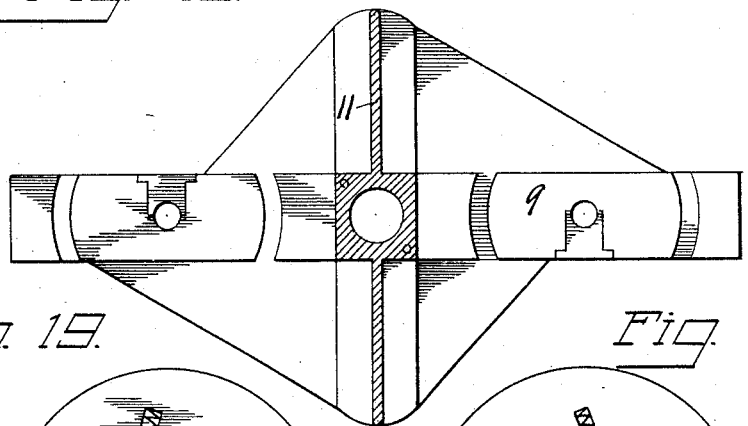
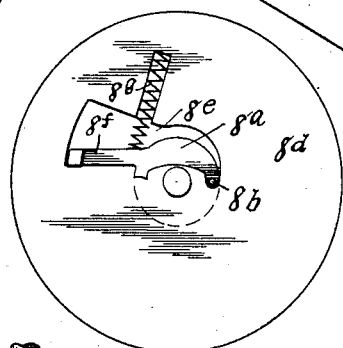
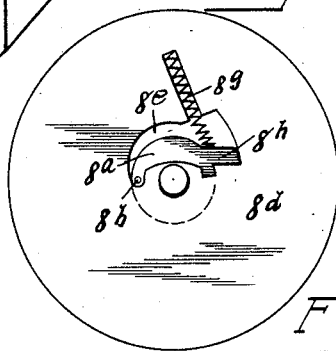
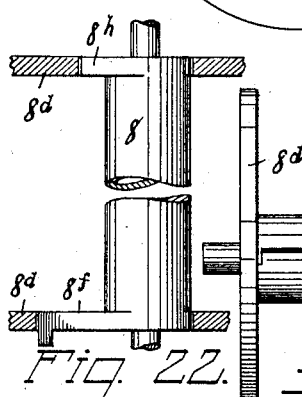
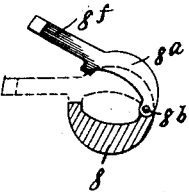
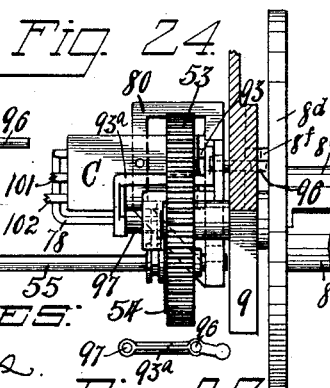
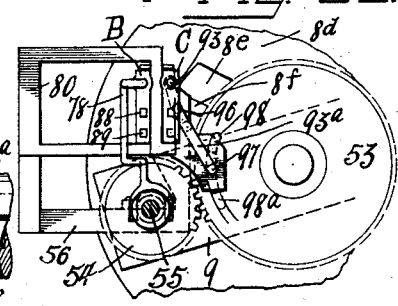
WITNESSES:
C. H. Bills
M. Haskell
INVENTOR.
Phillip Jacob Dreher,
By Owen & Owen,
His attys.

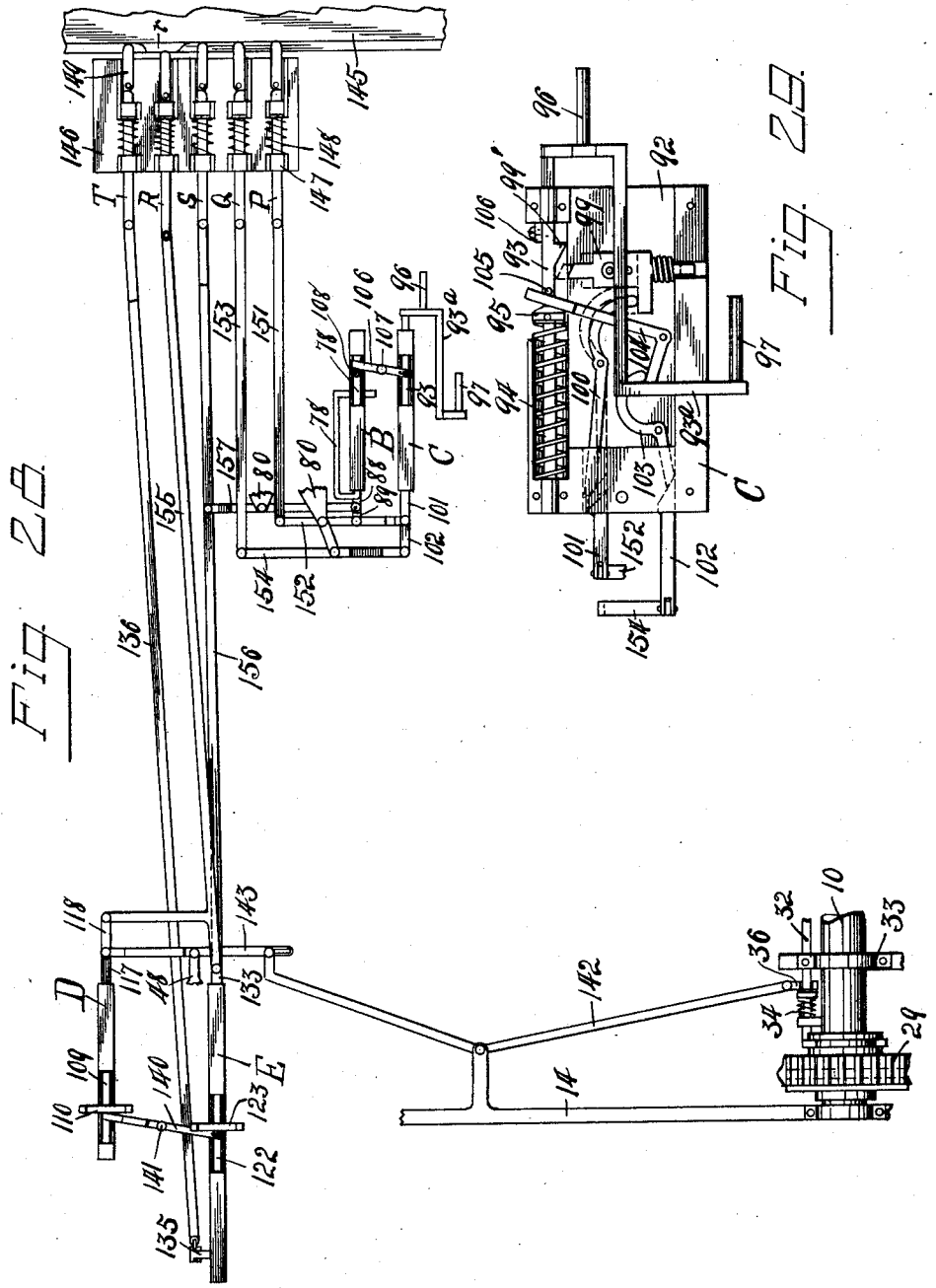

P. J. DREHER.
ENDLESS BELT OPERATING MECHANISM FOR AUTOMATIC PLAYERS.
APPLICATION FILED FEB. 10, 1911.
1,006,538.
Patented Oct. 24, 1911.
11 SHEETS—SHEET 9.
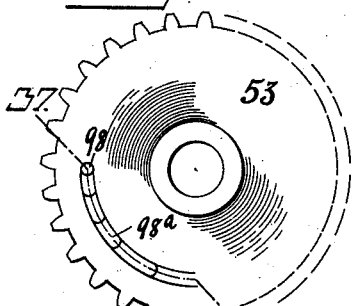
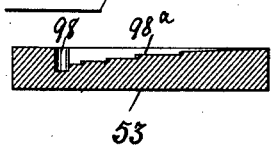
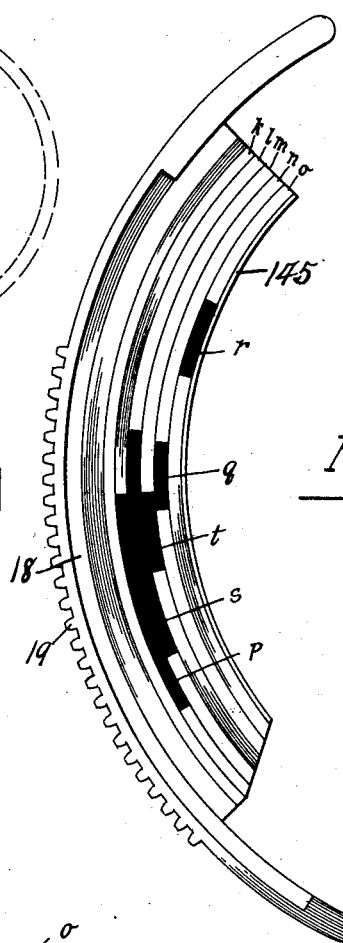
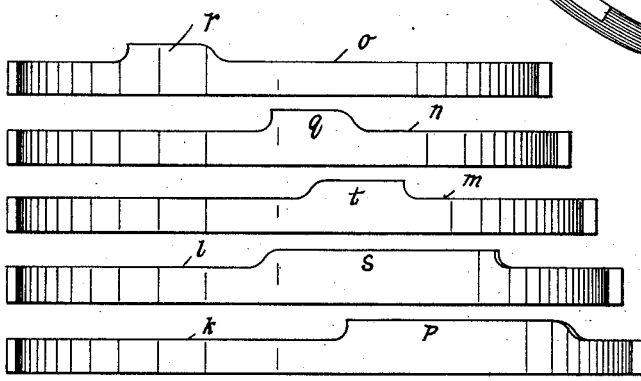
WITNESSES:
C. H. Bills,
M. G. Gaskell.
INVENTOR.
Phillip Jacob Dreher,
By Owen & Owen,
His attys.

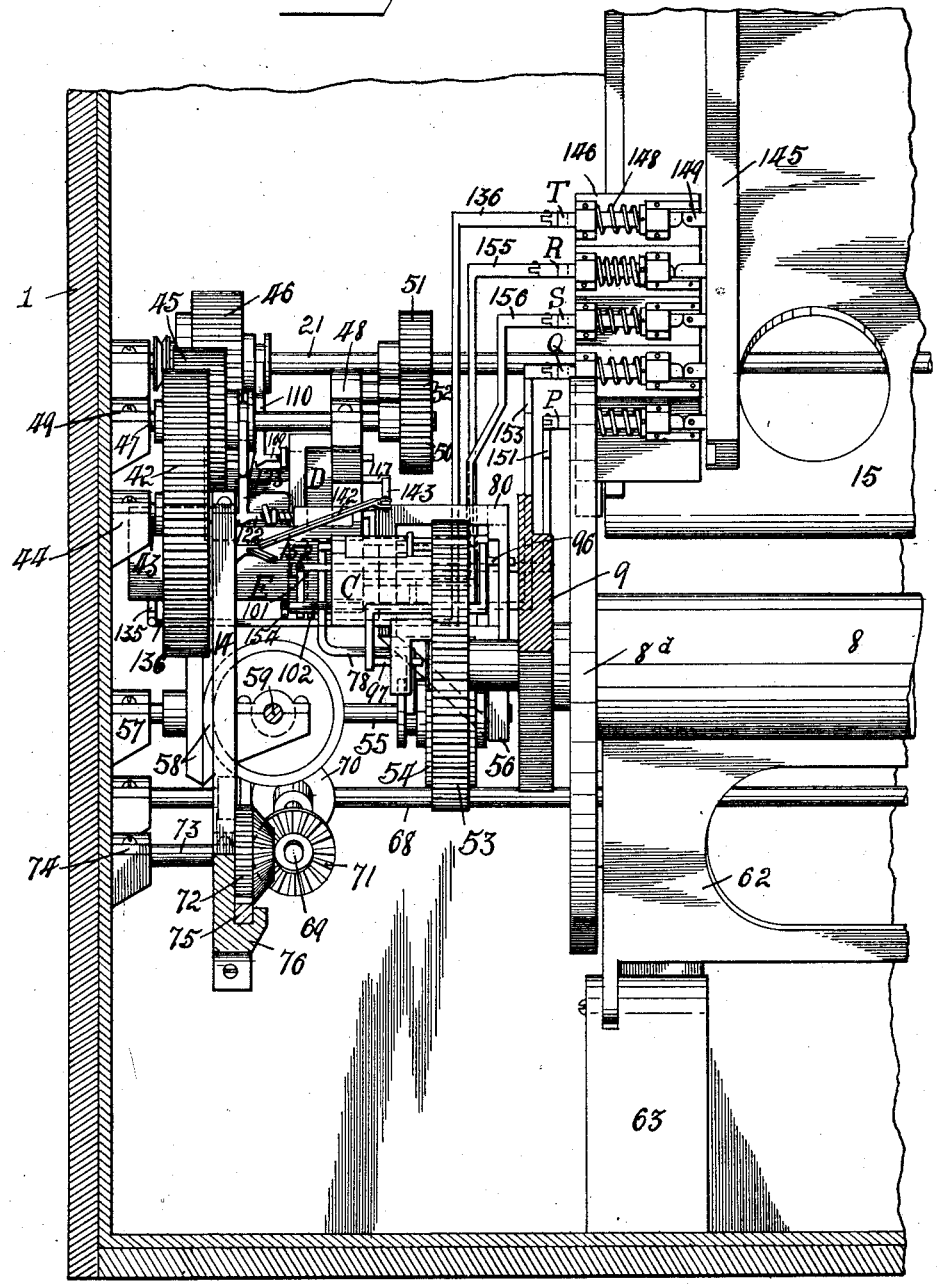

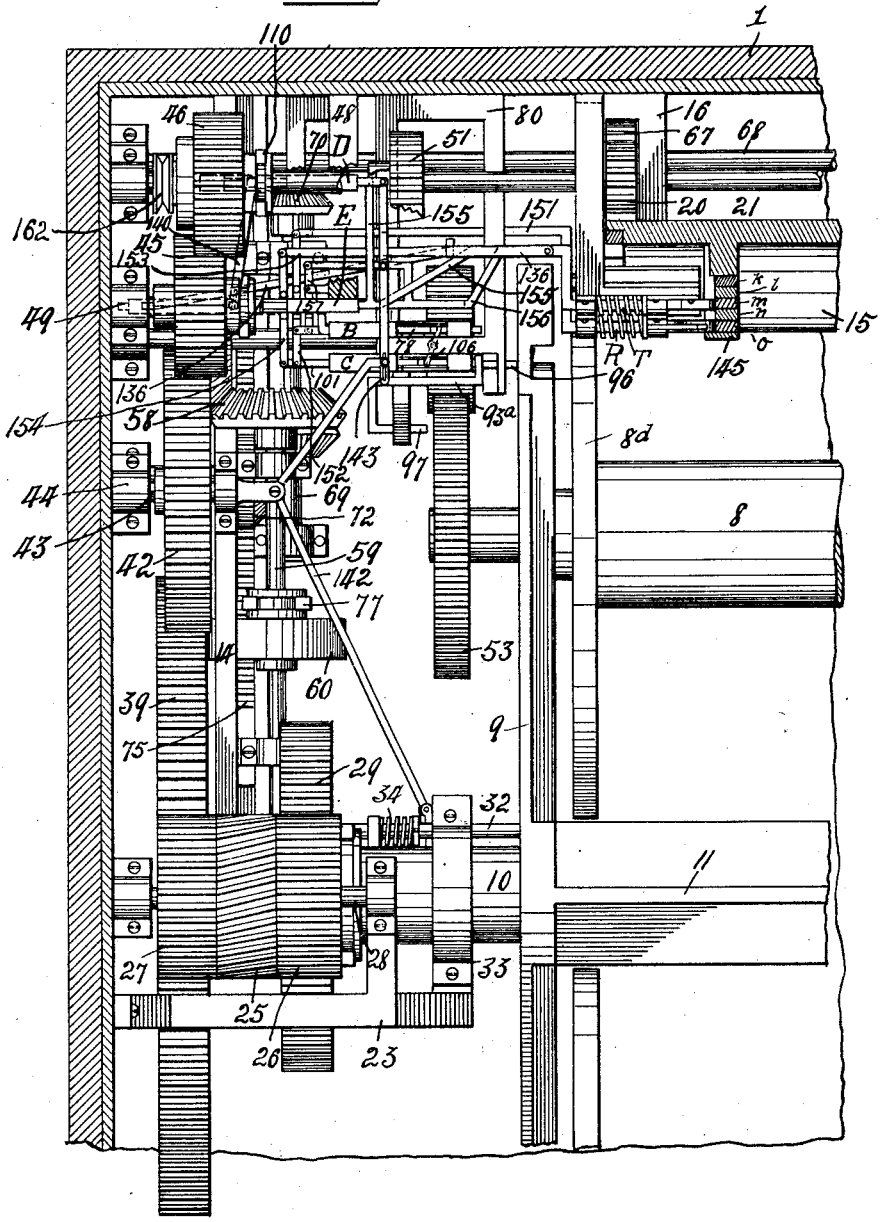

UNITED STATES PATENT OFFICE.

PHILLIP JACOB DREHER, OF TOLEDO, OHIO.

ENDLESS-BELT-OPERATING MECHANISM FOR AUTOMATIC PLAYERS.

1,006,538.    Specification of Letters Patent.    Patented Oct. 24, 1911.

Application filed February 10, 1911. Serial No. 607,877.

*To all whom it may concern:*

Be it known that I, PHILLIP JACOB DREHER, a citizen of the United States, and a resident of Toledo, in the county of Lucas and State of Ohio, have invented a certain new and useful Endless-Belt-Operating Mechanism for Automatic Players; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to musical instruments, and particularly to automatic players of the perforated music roll-type. With the apparatus of this class heretofore used it has been necessary to stop the same at the completion of the playing of a roll of music and either rewind the roll for a replaying of the same or replace such roll with one which is properly wound for playing. Furthermore the different pieces on such roll have been limited to a comparatively small number, thus necessitating a frequent changing of the rolls.

The object of my invention is the provision in an apparatus of this character, of mechanism for carrying an endless perforated music belt which may contain a large number of pieces, as for instance sixty or more, and is operative to automatically place the belt in repeating position when the pieces thereon have all been played, thus enabling the apparatus to continue playing indefinitely, so long as the proper coins, if it be a coin-controlled apparatus, are deposited therein for such purpose.

The invention is fully described in the following specification, and while, in its broader aspect, it is capable of embodiment in numerous forms, a preferred embodiment thereof is illustrated in the accompanying drawings, in which,—

Figure 2:
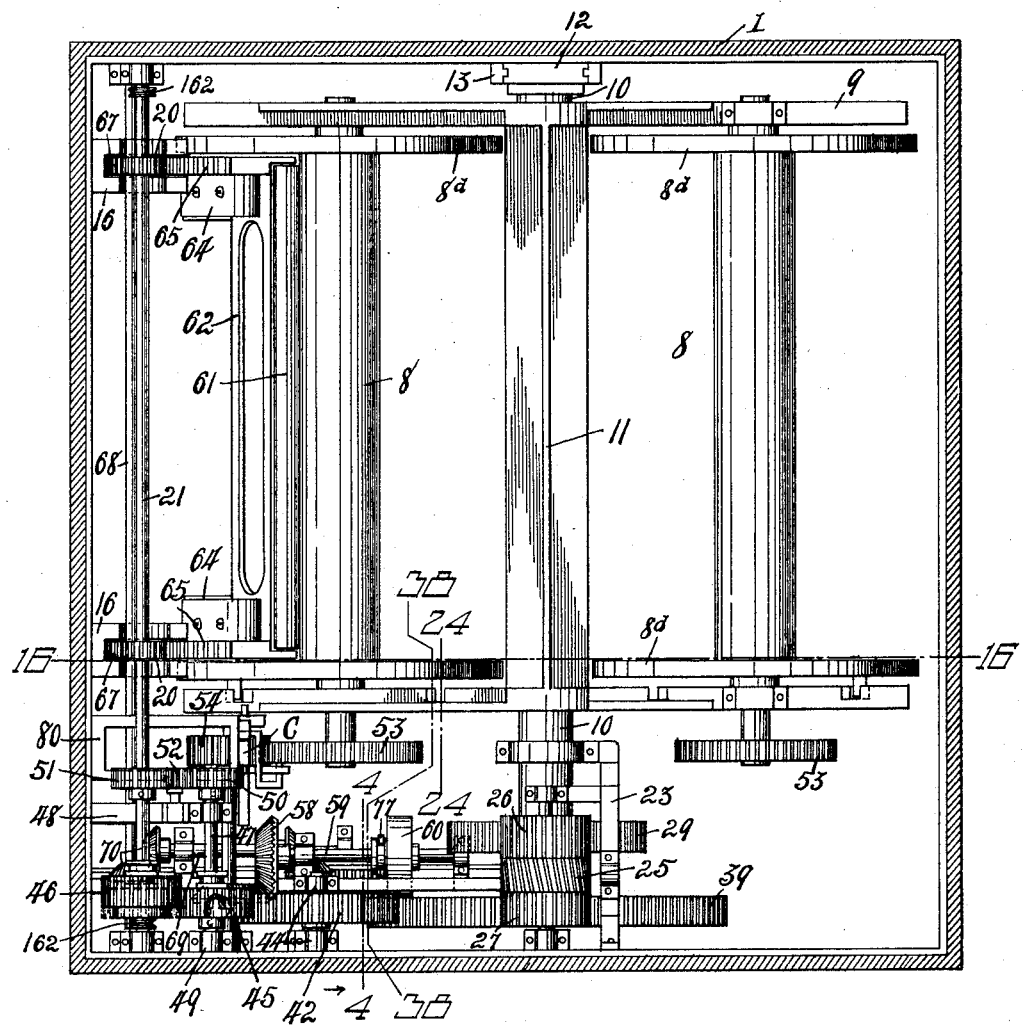

Figure 1 is a vertical section on the line 1, 1 in Fig. 3 with the belt looping blade at the limit of its down-stroke and the belt slackening members moved from normal position. Fig. 2 is a horizontal section on the line 2, 2 in Fig. 1 with parts removed. Fig. 3 is a vertical section on the line 3, 3 in Fig. 1 with parts broken away. Fig. 4 is an enlarged sectional detail on the line 4, 4 in Fig. 2. Fig. 5 is a partial section on the line 5, 5 in Fig. 4. Figs. 6, 7, 8 and 9 are different details of the clutch gears employed. Figs. 10, 11 and 12 are details of the control units D, B and E respectively. Fig. 13 is a detail of the spring retracting levers of such units. Fig. 14 is a detail of the lever which connects the shaft bars of units D and E. Fig. 15 is an enlarged detail of the cam coacting end of one of the control plungers and the associated parts. Fig. 16 is a vertical section on the line 16, 16 in Fig. 2 with the parts in the position which they assume when the belt looping blade is at the limit of its down-stroke. Fig. 17 is a side elevation of the control plungers and associated parts with the unit D operatively connected to one of the plungers and its gear shifted to clutch engaging position. Fig. 18 is a vertical section of the belt roll holding frame. Figs. 19 and 20 are opposite end views of the belt winding rolls. Fig. 21 is a side elevation of a belt winding roll with a portion broken away. Fig. 22 is a plan view thereof with the end disks partly broken away. Fig. 23 is an end view of the roll with the end disk severed therefrom. Fig. 24 is a section on the line 24, 24 in Fig. 2 with parts broken away. Fig. 25 is an end view of such mechanism. Figs. 26 and 27 are details of the shift bar of the unit C. Fig. 28 is a diagrammatical view of the several units with the coöperating ones thereof operatively connected together and to their actuating parts with the gear shifting parts of units D and E in reversing position. Fig. 29 is an enlarged detail of the unit C with the shift bar thereof in projected position. Fig. 30 is an enlarged detail of an end of the belt looping blade. Figs. 31, 32, 33, 34 and 35 are details, respectively, of the several race-ways and associated cams of the plunger actuating part of the belt looping blade. Fig. 36 is an outer side view of the gear which is carried on a trunnion of each belt roll. Fig. 37 is a section on the line 37, 37 in Fig. 36. Fig. 38 is an enlarged vertical section on the lines 38, 38 in Fig. 2 with parts broken away and removed and Fig. 39 is an enlarged plan of the operating mechanism, with parts broken away and removed.

Referring to the drawings, 1 designates a casing or box which may comprise a part of the casing of the instrument with which my invention is associated and has its top portion 2 hinged as at 3 to permit an opening thereof to render access to the interior of the casing. The top portion 2 is provided with the usual chamber 4 in which the pneumatic mouth-piece 5 of the instrument is located.

6 designates a track which is carried by the top and over which the perforated music belt passes in its movement under the mouth piece 5, the track being depressed as at 7 beneath such mouth-piece to permit it to project slightly therein, whereby the music belt A is held closely to the mouth-piece in its passage thereunder, as is necessary in this class of instruments. The forward end of the track 6 curves downwardly as shown. The music belt A is of the endless type and adapted to wind, as hereinafter described, upon rolls 8, 8, which are carried on opposite sides of the axis of a frame 9, which is mounted upon a shaft 10 for rotation therewith. The frame 9 has webs 11 extending in opposite directions from its axis at right angles to the plane in which the rolls 8, 8 are disposed, the lower one of which is adapted to guide the movement of the belt A, as hereinafter described. The shaft 10 is shown in the present instance as being journaled at one end in a bearing box 12 which is removably mounted in a bracket or support 13 secured to one side of the case 1 (see Figs. 2 and 3), while its other end is journaled in a bearing standard 14 (see Figs. 3, 4 and 5).

Each of the rolls 8 has a movable section $8^a$ which is hinged thereto as at $8^b$ and forms a jaw for coöperating with the fixed or remaining portion of the roll to grip a portion of the belt A, as hereinafter described. The inner or contiguous sides of the two roll sections are cut away to provide an interior cavity $8^c$ for receiving a looped portion $a$ of the belt and preventing a creasing of such loop when the jaws are closed. Disks $8^d$ are fixed to the ends of the rolls 8 within the sides of the frame 9, and each of such disks has a trunnion projecting axially therefrom and journaled in the sides of the frame 9 as indicated. The jaws $8^a$ of the rolls are enabled to have limited opening and closing movements relative to the disks $8^d$ due to the ends thereof projecting within openings $8^e$ in the adjacent disks (see Figs. 19 and 20) and one end of each jaw $8^a$ has a finger $8^f$ projecting laterally therefrom within its disk opening, as shown in Fig. 19. The fingers $8^f$ project from the sides of the jaws $8^a$ which are opposed to their pivots and have their free ends angled outwardly so as to project a distance without the outer sides of their disks for the purpose hereinafter described. The openings $8^e$ of the disks are of suitable size and shape to permit a limited opening of the jaws as indicated. Coiled compression springs $8^g$ are mounted in sockets provided in the disks $8^d$, and the one associated with the jaw finger $8^f$ acts thereon while the spring in the disk at the opposite end of the roll acts on a lug $8^h$ of the associated end of the jaw $8^a$ to normally hold the jaw closed, as is apparent.

The belt A is of the endless type and passes upwardly over the track 6 from the forward end thereof, under the mouthpiece 5, thence downwardly from the rear end of the track 6 and the frame 9 and rolls 8 thereof. The belt is looped as at $a$, $a$, between the jaws of the rolls 8 and gripped thereby, the points of engagement with the belt of the two jaws being so spaced that the belt is divided thereby into two equal lengths or halves, one for extending from one roll upwardly over the track 6 and down to the other roll, while the other half extends from one roll to the other under the frame 9, as indicated in Fig. 16. As the halves of the belt are of considerably greater length than would enable them to merely extend from one roll to the other over their respective courses the surplus portions thereof are wound upon one roll and during the operation of the machine unwind therefrom and wind upon the other roll.

The gripping of the belt in the manner described causes the two halves thereof, upon a winding of either roll, to wind thereon one upon the other as is apparent by reference to Fig. 16. By reference to Fig. 16 it will be apparent that upon a turning of the rear roll 8 in one direction with the belt gripped thereby, the upper and lower sections of the belt will wind upon the roll one upon another in the same direction and will unwind from the other roll in the same manner with the upper section passing from the roll upwardly over the track 6 and the lower section passing from the roll downwardly under the frame 9 and upon the rear roll. When the belt has been transferred from the forward to the rear roll the loop $a$, or portion of the belt engaged by the forward roll, will be drawn from engagement with such roll so that the forward portion of the belt will pass from the rear roll 8 under the frame 9 and over the track 6 without engagement with the forward roll, as indicated by the dotted line $b$ in Fig. 16. The belt having now been transferred to the rear roll 8, except for the portion thereof which extends around the frame 9 and over the track 6, the frame is turned half around, by the means hereinafter described, so as to place the full roll at the forward portion of the machine while the empty roll is transferred to the rear, such turning movement of the frame being in the direction indicated by the arrow $c$ in Fig. 16. It will be apparent that during the transferring movement of the two rolls the free portion of the belt A will slide freely over the track 6 so that upon a completion of such transferring movement the free portion of the belt will be disposed adjacent the rear roll with one half of the belt leading from the filled or forward roll over the track 6 and the other half thereof leading from such roll under the frame 9 with the free ends of the two belt halves disposed to the rear of the rear roll 8.

To effect a gripping of the free ends of the upper and lower halves of the belt A, which ends terminate as described, a belt-looping blade 15 is disposed to the rear of the rear roll 8 in position for its lower edge, when moved downwardly and forwardly, to force the registering portion of the belt A between the jaws of the associated roll 8, which jaws are held open, as hereinafter described, for such purpose. The looping-blade 15 transversely describes an arc of a circle and is carried for circular movements by brackets 16, 16, which project forwardly from the rear side of the casing 1 and carry curved guide ribs 17 on their inner sides which work in complemental grooves or races 18 in the respective ends of the blade 15 (Fig. 16). The blade 15 is provided adjacent its ends at the rear side thereof with rack teeth 19 with which pinions 20, which are carried by a horizontal shaft 21 disposed at the rear of the blade, are adapted to mesh to effect a raising and lowering of the blade upon a turning of the pinions in the proper directions for such purposes. The mechanism for driving the shaft 21 to effect properly timed lowering and raising movements of the blade 15 will be hereinafter described.

Power for driving the operating mechanism of my invention is communicated thereto through a shaft 22 from the motor or other suitable means which is utilized for operating the player, said shaft being shown as journaled at one end in one side of the casing 1 and at its other end in a suitable bearing bracket 23 within the casing. A worm 24 is carried by this shaft within the case in mesh with a worm wheel 25 which is mounted between gears 26 and 27 on a shaft 28, which is journaled in the bracket 23 and in a suitable bearing secured to the casing side. The gear 26 meshes with a gear 29, which is loosely mounted on the shaft 10 upon which the frame 9 is mounted. The gear 29 forms the shiftable member of a clutch, the fixed member 30 of which is keyed to the shaft 10 and is provided on its inner side with a tooth for engaging with a corresponding socket in the inner side of the gear 29. The gear 29 is shown as having its side socketed to receive the member 30. The same form of clutch and shiftable gear is used in several places throughout the mechanism and the construction thereof is illustrated in detail in Figs. 6, 7, 8 and 9. A forked gear-shifting arm 31 engages with a peripheral groove in the hub of the gear 29 and has an arm or bar 32 projecting laterally therefrom in the direction of the frame 9 and mounted for reciprocatory movements in a bracket 33 carried by the bearing standard 14. A spring 34 acts on the bar 32 to normally hold it in position to retain the gear 29 out of clutch engagement with its member 30 and to hold the free end of such arm in engagement with a socket 35 in the adjacent side of the frame 9. The frame is provided with two sockets 35 which are disposed on opposite sides of the shaft 10 at diametrically opposite points in a circle concentric to such shaft and in position for the free end of the bar 32 to seat in a registering one of the same when the frame 9 is in operative or working position. The other socket 35 is brought into register with the bar 32 when the frame 9 is given a half turn to reverse the positions of the rolls 8. The shifting bar 32 is moved against the tension of its spring by the movement of a bell-crank lever 36, which is pivoted to the bracket 33 and has one arm coacting with the shift bar 32 and its other arm connected by a rod or other suitable connection 37 to the movable portion of a bellows 38, whereby a contraction of the bellows by air suction, as is common in instruments of this class, will effect a movement of the lever 36 and shift bar 32 to release the latter from engagement with the frame 9 and to shift the gear 29 to engage its member 30. Upon such shifting of the parts the bellows 38 assumes its normal position and the end of the arm 32 is free to drop within the other notch 35 when in register therewith so as to stop the rotation of the frame and at the same time shift the gear 29 from clutch engagement with its member.

The gear 27 meshes with a large disk gear 39, which is loosely carried by a shaft 40, journaled in the standard 14 and a bearing 41 secured to the casing side. The gear 39 in turn meshes with an idler 42, the shaft 43 of which is journaled in a part of the standard 14 and in a bearing 44 secured to the casing side. The gear 42 meshes with and drives a gear 45, which in turn meshes with a gear 46, which latter gear is loosely mounted on the associated end of the shaft 21, while the gear 45 is loosely mounted on a shaft 47 which parallels the shaft 21, and is journaled at one end in a bracket 48 and at its other end in a bearing 49 secured to the casing side (see Figs. 1, 2 and 3). The gears 45 and 46 are shiftable into and out of engagement with the associated clutch members which are keyed to the respective shafts, such clutch gears being similar in construction to the one shown in Figs. 7, 8 and 9. The gears 45 and 46 are automatically shifted by the mechanism hereinafter described. The shaft 47 carries a gear 50, which drives a gear 51 on the shaft 21 through the medium of an idler 52 which is mounted on a stud projecting from the bracket 48. The rotation and coöperative action of this mechanism is such that a driving of the shaft 21 through the medium of the gears 45 and 46, the former being out of engagement with its clutch member and the latter in engagement with its clutch member, will rotate the gears 20 in a direction to effect a down stroke of the belt looping blade 15, whereas a driving of the shaft 21 through the medium of the gear 45 in engagement with its clutch member, shaft 47 and gears 50, 52 and 51 will rotate the gears 16 in a direction to impart an up stroke to the blade 15.

Each roll 8 has a gear 53 mounted without the frame 9 on the trunnion thereof which is disposed adjacent the operating mechanism (see Figs. 1, 2 and 3), and the rear one of these gears, or that which is carried by the trunnion of the roll upon which the music belt A is to wind, meshes with a gear 54, which is loosely and shiftably carried by the shaft 55. This shaft is journaled at one end in a bearing bracket 56 and at its other end in a bearing 57 secured to the casing, as best shown in Fig. 3. The gear 54 is of similar type to the gears 45 and 46 and is automatically shifted into and out of engagement with its clutch member by the mechanism hereinafter described. A set of beveled gears 58 communicate rotation from a shaft 59 to the shaft 55, said shaft 59 being mounted in suitable bearings at right angles to the axis of the gear 39 in radial alinement therewith, and having a friction wheel 60 feathered thereto and in peripheral contact with the inner side of the disk 39. It is thus apparent that the wheel 60 is frictionally driven by the gear 39 and that rotation is communicated therefrom to the rear gear 53 and roll 8 through the intermediate gearing.

In order to gradually change the speed of driving of the roll upon which the belt is winding to compensate for the gradually increasing thickness of the roll as the belt winds thereon, I mount a pressure roll 61 in a swinging frame 62 in position to bear against the belt winding upon the rear roll 8 (see Figs. 1, 2, 3 and 16). The frame 62 is fulcrumed in bearings 63 beneath the rear portion of the frame 9 and springs 64 act thereon to hold the pressure roll 61 in yielding contact with the roll 8. Segmental racks 65 pivotally project rearwardly from each end portion of the frame 62 and work in guides 66 by means of which they are held in mesh with pinions 67, carried by a shaft 68, thus causing rotation to be communicated to such shaft from oscillatory movements of the frame 62. The shaft 68 is journaled in suitable bearings within the case 1, as best shown in Fig. 3, and rotation is communicated therefrom to a shaft 69 through a set of beveled gears 70. The shaft 69 is journaled in suitable bearings and carries a beveled gear 71 at its forward end in mesh with a beveled gear 72, carried by a shaft 73, which is journaled in bearings 74 (see Figs. 2 and 3). The bevel gear 72 has a set of spur teeth thereon in mesh with the teeth of a rack 75 which has sliding movements communicated thereto by a rotation of said gear and is guided for such movements by a guide part 76. An arm 77 projects upwardly from the forward end of the rack-bar 75 and has its upper end in forked engagement with a grooved hub portion of the friction wheel 60 to slide such wheel longitudinally of its shaft upon a movement of said rack-bar. The gearing and parts of the connection between the pressure roll 61 and the rack-bar 75 are so proportioned that the friction wheel 60 will move toward the axis of the gear as the size of the belt roll increases whereby to gradually decrease the speed of driving of such roll in proper proportion. Upon a turning of the belt holding frame 9 to reverse the positions of the rolls 8, the rear gear 53 will turn out of mesh, and the gear which was previously at the front of the frame will turn into mesh, with the gear 54.

The several units which coöperate with the parts hereinafter described to control the movements of the several clutch gears of the mechanism and to lock and release the different parts of the units B, C, D and E will now be described.

The unit B controls the shifting of the gear 54 which when in engagement with its clutch member, drives the winding roll 8 through the medium of the meshing gear 53. This unit (see Fig. 11) comprises a gear shifting rod 78, one end of which is mounted for reciprocatory movements in a holder 79, which is carried by a bracket 80 secured to the adjacent side of the casing 1. The other end of the rod 78 terminates in a fork 78ª and is suitably angled to place such fork in engagement with the peripherally curved hub portion of the gear 54. A coiled compression spring 81 normally acts on the portion of the rod which is mounted in the holder 79 to move such rod to place its gear into engagement with its clutch member. The spring 81 has one end in thrust engagement with a part of the plate and its opposite end in thrust contact with a collar 82, which is loosely mounted on the rod 78 for reciprocatory movements thereon, the spring thrust movement of such collar being limited by a pin 83 on the rod. A spring pressed catch 84 is carried by the holder 79 for engagement with a tooth 85 on the rod 78 when such rod is retracted against the tension of the spring 81 with its gear 54 out of engagement with its clutch. A lever 87 is fulcrumed to the holder 79 with one end in contact with the catch 84 and its other end in position to be moved by the inward movement of a wedge-bar 88 whereby to effect a rod releasing movement of the catch 84, as is apparent. The collar 82 and spring 81 are retracted from the position shown in Fig. 11 by the inward movement of a wedge-bar 89, which works within a part of the plate 79, said bar acting on a lever 90, which in turn acts upon one arm of a bell-crank lever 91 to move it to retract the spring and collar relative to the pin 83. The shift rod engaging arm of the lever 91 is forked and straddles the shift rod intermediate the thrust collar 82 and pin 83. The movement of the shift rod 78 to throw the gear 54 out of engagement with its clutch is effected through the medium of the unit C which will now be described.

The unit C (Fig. 29) comprises the holder 92, which is also carried by the bracket 80 and has a rod 93 reciprocally carried by its upper part and influenced to move outwardly or toward the frame 9 by a coiled compression spring 94, which has its opposite end-thrusts against a part of the holder 92 and a fixed collar 95 on said rod. The rod 93 has its outer end angled and provided with a pin 96, which, when the rod 93 is thrown outwardly by the spring 94, stands in position to coact with the angled end of the associated finger 8$^f$ of the rear roll jaw 8$^a$ whereby to effect an opening of such jaw as the roll rotates. The rod 93 is also shown as being angled as at 93$^a$ and carrying a pin 97, which, when the rod 93 is projected, engages with a socket 98 in the associated gear 53 to stop its rotation and the consequent rotation of the attached roll 8. The socket 98 is so positioned that the pin 97 will move into register therewith and stop the rotation of the gear 53 when the jaw 8$^a$ of the roll 8 has been moved to full open position by the coaction of the pin 96 with the finger 8$^f$ thereof. During the normal running of the machine or except when a roll 8 is taking a fresh bight of the belt, the bar 93 and its attached ends are held in retracted position against the tension of the spring 94 by a spring pressed catch 99 which engages a tooth 99' on said bar. A trip-lever 100 is pivoted to the plate 92 and is moved to effect a release of the catch from bar engagement by an inward movement of a wedge-bar 101 in contact with an arm thereof. The bar 93 is positively retracted against the tension of its spring to release the points 96 and 97 from engagement with their respective parts by the inward movement of a wedge-bar 102, the wedge end of which acts on an end of a lever 103 to oscillate it, which lever in turn imparts a retracting movement to the bar 93 through the medium of the bell-crank lever 104, one end of which is in forked engagement with the bar 93 intermediate the pin 105 thereon and collar 95.

The units B and C are arranged side by side and a lever 106, which is fulcrumed intermediate the units to the brackets 80, as at 107, Figs. 28 and 39, has one end pivotally attached to the bar 93 of the unit C, while its other end projects over the shift rod 78 of the unit B and, when the bar 93 is moved outwardly under the influence of its spring 94, acts against a lug 108 on the shift-rod 78 to move said rod to effect a shifting of the attached gear 54 from engagement with its clutch (see Figs. 11, 28, 29 and 39).

The units D and E are carried by the bracket 48 and act in conjunction with each other to control the shifting movements of the gears 45 and 46, which gears control the movements of the looping blade 15.

The unit D, which is shown in detail in Fig. 10, carries a horizontally movable bar 109, which has an upwardly projecting arm 110 in forked engagement with the grooved hub of the gear 46 (see Fig. 17), said bar and its arm being shiftable in directions to move the gear 46 into and out of engagement with its clutch member. A coiled compression spring 111 acts on the bar 109 to normally move it into position to engage said gear with its clutch. This spring has the movable end thereof in engagement with a collar 112 which is loose on the bar 109 to enable said collar to be moved to retract the spring without moving the bar 109. The outward movement of the collar on the bar 109 is limited by a pin 113 thereon. A spring pressed catch 114 normally engages a tooth 115 on the bar, when retracted, to retain it in such position. The catch 114 is moved to release the bar tooth by a movement of a lever 116 in engagement therewith, which movement is effected by the inward movement relative to the unit of a wedge-bar 117, the wedge end of which coacts with an end of said lever. A second wedge-bar 118 is movable inwardly and outwardly relative to the unit D, and when moved inwardly from its normal outward position acts through a lever 119 upon the bell-crank lever 120 to effect a retraction of the spring 111 relative to the bar 109, said lever 120 having one end thereof forked and straddling the bar 109 intermediate the pin 113 thereon and the collar 112.

The unit E (Fig. 12) comprises a holding plate 121 in which a bar 122 is mounted for reciprocatory movements in parallelism with the shaft of the clutch gear 45. The bar 122 has an arm 123 projecting upwardly therefrom intermediate its ends with its upper end in forked engagement with the peripherally grooved hub of the shift gear 45, whereby movements of the bar 122 effect shifting movements of said gear. The bar 122 has the two coiled springs 124 and 125 mounted thereon, the former being of greater tension than the latter and operative to move the bar to throw the gear 45 into engagement with its clutch member, while the spring 125 is operative, when the spring 124 is retracted, as hereinafter described, to move said gear to release its clutch member. The spring 124 acts at its movable end upon a collar 126 which is mounted for loose reciprocatory movements upon the bar 122, the outward movements of such collar being limited by a stop pin 127 on the bar. The movable end of the spring 125 has its thrust against a fixed collar 128 on said bar. The bar 122 is held retracted against the tension of the spring 124 by a spring pressed catch 129 which engages a tooth 130 on the bar. When the bar 122 is in position for its gear 45 to engage its clutch member it is held in such position by a spring pressed catch 131 engaging the adjacent portion of the collar 128, thus preventing the bar from moving to the retracted position shown in Fig. 12, when the spring 124 is retracted for the purpose of permitting such movement, until the catch 131 is moved to release the collar 128. The catch 129 is moved to release its bar tooth 130 by the action thereon of the lever 132 when moved by the inward movement of the wedge end of a release bar 133 in engagement therewith, as shown in Fig. 12. The catch 131 is moved to release the bar collar 128 by movement imparted to a lever 134 by the movement of a coacting lever 135, when said latter lever is oscillated by a movement of the thrust bar 136 in the direction indicated by the arrow, Fig. 12. The spring 124 and its collar 126 are moved relative to the bar 122 to the retracted position shown in Fig. 12 by the inward movement of the wedge end of the thrust bar 137 in contact with a lever 138, which lever acts through the bell crank lever 139 to move the spring, as is apparent.

In order to effect a positive releasing movement of the clutch gear 46 when the gear 45 is moved into engagement with its clutch, a lever 140 is pivoted to the bracket 48 intermediate the units D and E, as at 141 (Figs. 28 and 39), and has one end pivoted to the bar 122 of the unit E and its other end resting freely upon the top of the bar 109 of the unit D in position to act on the base of the arm 110 of such bar to retract said bar 109 to release the gear 46 when the bar 122 of the unit E moves to throw the gear 45 into engagement with its clutch. A detail of the bell crank levers 91, 104, 120 and 139 of the units B, C, D and E respectively is shown in Fig. 13, said levers all being of the same form.

During the period of the feeding of the belt A from the front roll to the rear roll 8, both of the shiftable gears 45 and 46 are held in neutral or inoperative position by reason of the catch 114 engaging the tooth 115 of the shift bar 109 of the unit D and holding such bar retracted against the tension of its spring 111, and the catch 129 holding the shift bar 122 of the unit E retracted against the tension of its spring 124. In order that the gear 46 may be thrown into engagement with its clutch to effect a downward feeding of the blade 15 when the shift gear 29 is thrown into engagement with its clutch to cause a turning of the roll frame 9, the shift lever 36 is shown in the present instance (Figs. 1 and 28) as being connected to the wedge-bar 117 of the unit D through the medium of the connected levers 142 and 143, which are fulcrumed respectively to the standard 14 and bracket 48 with the lever 143 attached to the wedge-bar 117. The connection is such that upon a shifting of the lever 36 to place its gear 29 into engagement with its clutch, the wedge-bar 117 will be moved inwardly to effect a release of the catch 114 from the shift bar 109, thus permitting the spring 111 to act on said shift bar to throw the gear 46 into engagement with its clutch.

The parts of the units B, C, D and E are intended to be operated at predetermined points in the lowering and raising movements of the looping blade 15, and the mechanism shown in the present instance for automatically causing the properly timed movements of the different parts of said units will now be described.

The looping blade 15 is provided at the end thereof adjacent to the operating mechanism with a concentrically curved segmental part 145, which is provided on the side thereof adjacent to said mechanism with five race-ways which are curved in arcs concentric to the arc of the blade 15 and designated $k$, $l$, $m$, $n$ and $o$. Said race-ways are provided respectively with the cams or elevated surfaces $p$, $s$, $t$, $q$ and $r$ which are arranged at predetermined points therein. Carried by a frame or bracket 146 at the outer side of the race-way part 145 are a series of five control plungers (see Figs. 16 and 17), the lower of which is designated P, the second Q, the third S, the fourth R and the fifth T, which plungers have the ends thereof which are adjacent to the part 145 disposed to respectively coact with the cams $p$, $q$, $s$, $r$ and $t$ upon movements of the blade 15, as indicated in Fig. 16. These plungers are guided for reciprocatory movements in guides 147 secured to the bracket 146, and each is yieldingly held in contact with its race-way by the action thereon of a coiled compression spring 148. The end portions 149 of said plungers which coact with the part 145 are pivoted to the plungers, as indicated in Figs. 15 and 17, and each is adapted to be moved in only one direction from straight alinement with its plunger, as shown. The ends 149 of the plungers P, Q and R are adapted to break or turn relative to the plungers when the cams in their respective race-ways move into contact therewith upon an up stroke of the part 145, while the parts 149 of the plungers S and T are adapted to break or pivotally turn relative to their plungers when the cams in their respective race-ways move into contact therewith upon a down stroke of the part 145, thus causing each plunger to be reciprocated in only one direction of movement of the part 145. A spring 150 acts on each plunger part 149 to normally retain it in straight position relative to its plunger.

The cam surfaces $p$, $q$, $r$, $s$ and $t$ are so positioned in their respective race-ways that upon a downward movement of the blade 15 and its part 145, the cam $p$ will first move into engagement with the plunger P to effect an outward movement of said plunger; the cam $q$, while the cam $p$ is still in engagement with its plunger, will then move into engagement with and force its plunger Q outwardly; the cam $r$, which may be termed the reverse cam, will next move into contact with the plunger R and force it outwardly after the plungers P and Q have been released from their respective cams and at substantially the end of the downward movement of the part 145, said reverse plunger R being connected with the units D and E, as hereinafter described, to effect a reversal of the direction of movement of the blade 15. Upon the reverse or upward movement of the part 145 the reverse cam $r$ will move from engagement with its plunger R; the cam $s$ will next move into engagement with its plunger S and remain in engagement therewith until the cam $t$ moves into engagement with the stopping plunger T, which latter effects an operation of mechanism to stop the raising movement of the blade 15, as hereinafter described.

The cams $p$, $q$ and $r$ have the lower ends thereof inclined to adapt the plungers P, Q and R to ride outwardly thereon upon a downward movement of the part 145, the opposite ends of said cams terminating abruptly to effect a breaking or pivotal movement of such plunger ends when the cams move in contact therewith upon an upward movement of the part 145. The cams $s$ and $t$ have the upper ends thereof inclined and their lower ends terminating abruptly to permit the ends of the coacting plungers S and T to ride outwardly thereon upon an upward movement of the part 145 and to break or pivotally turn when the abrupt ends of the cams move into contact therewith upon a downward movement of the part 145.

When the looping blade 15 is in normal or elevated position its lower edge stands approximately at the point indicated in Fig. 16 by the arrow $d$, and upon a downward movement of such blade its lower edge moves approximately to the point indicated by the arrow $e$ in such figure before the plunger P is engaged and moved outwardly by the contact therewith of its raceway cam $p$. During the movement $d\ e$ of the folding blade 15 the shift gear 29, in engagement with its clutch 30, has imparted a half rotation to the frame 9 to place the empty roll 8 to the rear of the machine in proximity to the blade 15, the frame 9 being stopped in proper position for such purpose by reason of the pin end of the shift bar 32 working into a registering notch 35 in the frame.

The plunger P is shown in Figs. 28 and 38 as being connected by a bar 151 to a lever 152 which fulcrums to a part of the bracket 80 and has connection with the outer ends of both the wedge-bar 89 of the unit B and the wedge-bar 101 of the unit C, whereby to move such parts inwardly relative to their respective units when the plunger P is moved outwardly by the coaction therewith of the cam $p$. The inward movement of the wedge-bar 89 of the unit B imparts movement to the bell-crank lever 91 to retract the spring 81 and collar 82 relative to the shift rod 78 whereby to relieve such rod of the spring pressure which acts therethrough upon the shift gear 54 to hold it in engagement with its clutch member. The inward movement of the wedge-bar 101 of the unit C in turn moves the lever 100 to effect a release of the catch 89 from the tooth 99 of the bar 93 of such unit to permit such bar to move under the influence of the spring 94 to place its pin 96 in the path of revolution of the angled end of the associated roll jaw finger $8^f$ and to throw its pin 97 into end contact with the outer side of the associated gear 53 in the path of revolution of the socket 98 therein. When the jaw finger $8^f$ has moved into engagement with the pin 96 and the jaw $8^a$ is opened to full extent, the socket 98 in the gear 53 will have moved into register with the pin 97 to permit it to drop therein and lock the gear 53 and attached roll 8 against further turning. As the pin 97 works into the gear socket 98 the movement thereby communicated to the attached bar 93 will rock the lever 106 which in turn will act upon the lug 108 of the shift rod 78 of the unit B to move such rod to disengage the gear 54 from its clutch member, thus disconnecting the roll driving mechanism from the associated gear 56. Instead of permitting the pin 97 to drop abruptly into the socket 98 of the gear 53 it is preferable to step the path leading to such socket, as indicated at $98^a$, Fig. 25, so that the pin 97 and attached parts will have a gradual inward movement to the depth of the socket 98.

By the time the jaw $8^a$ of the associated roller 8 has been opened the lower edge of the blade 15 has lowered sufficiently to enter between the jaw and the major portion of the roll, which it does upon its continued downward movement, forcing the registering portion of the belt A therein in the form of a loop $a$ as indicated in Fig. 16. When the lower edge of the blade has entered between the roll jaws the cam $q$ moves into engagement with the plunger Q and forces it outwardly. This plunger is connected by a bar 153 to a lever 154, which is fulcrumed to a part of the bracket 80 and has its opposite end in connection with the push bar 102 of the unit C. The action of the bar 153 and lever 154 is such that upon an outward or retracting movement of the plunger Q the wedge-bar 102 will be forced inward and movement communicated through the lever 103 to the lever 104 to retract the bar 93 against tension of its spring 94, thus releasing the pins 96 and 97 from engagement with the jaw finger $S^t$ and gear 53, respectively. The shift rod 78 of the unit B, however, still remains in gear released position so that the gear 54 is not moved into driving engagement with the gear 53 until one of the other plungers is subsequently actuated.

When the blade 15 is at the limit of its down stroke the cam $r$ has moved into engagement with and effected a retraction of the plunger R. This plunger is connected by a bar 155 to both the wedge-bar 118 of the unit D and the wedge-bar 133 of the unit E, as indicated in Figs. 12 and 28. Upon the movement which is actuated in the bar 151 by the retraction of the plunger R the wedge-bar 118 is moved inwardly to effect a retraction of the spring 111 and collar 112 relative to the shift-bar 109 of the unit D and the wedge-bar 133 is moved inwardly to effect a release of the catch 129 from engagement with the bar 122 of the unit E, thus permitting such bar to be moved under the influence of the spring 124 to throw the reversing gear 45 into engagement with its clutch. The throwing in of the shift-bar 122 moves the lever 140 to effect a retraction of the shift-bar 109 (the spring 111 thereof having been previously retracted for such purpose) and forces the gear 46 out of engagement with its clutch. A reversing movement is now communicated to the shaft 21 through the shaft 47 and gears 50, 51 and 52 thus imparting an upward movement to the blade 15.

Upon the upward movement of the blade 15 the plunger S is engaged and retracted by the cam $s$, and the movement thus imparted to such plunger is communicated to the wedge-bar 137 of the unit E through the medium of the bar 156. As the bar 137 is moved inwardly it acts on the lever 139 through the lever 138 and effects a retraction of the spring 124 and collar 126 relative to the shift bar 122, such bar being held at the limit of its movement to the left due to the engagement of the catch 131 with the part 128 thereon. A lever 157 (Fig. 28), which is fulcrumed to a part of the bracket 80, connects the bar 156 with the wedge-bar 88 of the unit B so that an inward movement is communicated to said wedge-bar by a retracting movement of the plunger S, and the catch 84 consequently moved to release the shift rod 78 to permit it to move under the influence of the spring 81 to throw the gear 54 into mesh with the gear 53 whereby to drive the rear roll 8 to effect a winding of the two halves of the belt A thereon one upon another as is apparent. The cam $s$ is of sufficient length to remain in contact with its plunger S to hold the spring 124 of the unit E retracted until the cam $t$, the last one to act, moves into engagement with the plunger T at approximately the limit of upward movement of the part 145. The plunger T is connected by the bar 136 to the lever 135 so that a retraction of such plunger effects a release of the catch 131 of the unit E from the shift-bar 122. Upon such release of the shift-bar the spring 125 acts thereon to throw it to the right, which effects a disengagement of the attached gear 45 from its clutch, thus stopping the further upward movement of the blade 15. Upon the movement of the shift bar 122 and its gear 45 from clutch engaging position, the end of the lever 140 which coacts with the shift bar 109 of the unit D moves to the left relative to the shift-bar 109 so that the shift bars of both the units D and E stand in neutral position.

When the belt A is engaged with a roll 8 it is important that sufficient slack be provided in the belt to enable it to have at least one turn upon the engaged roll before such slack is taken up and strain is applied to the belt for unwinding it from the front roll, as one or more convolutions are thus placed upon the winding roll to coact with the gripping jaw thereof to prevent a disengagement of the loop $a$ therefrom. This is accomplished by passing the belt A between two tension blades 158 and 159 which are located in the upper portion of the apparatus beneath the rear portion of the track 6. These blades extend from one side to the other of the machine and have their ends mounted for horizontal movements in guides 160, the sets of guide-ways of which are vertically spaced to adapt the blades to have free movements in parallel horizontal planes past each other. The blades 158 and 159 are attached at each end to an endless cable 161 which passes over a sheave or other suitable driving means 162 on the associated end of the shaft 21 (see Fig. 3), with one portion passing upwardly from such sheave around a guide sheave 163 at the rear end of the guide-way of the blade 159 and attached to such blade, while the other portion of the cable passes upwardly over the sheave 164 at the rear end of the guide-way for the blade 158 and attached to such blade. The opposite side edges of the blades 158 and 159 are connected by end portions of the cable which pass around a sheave 165 at the forward end of the guide 160. When the belt looping blade 15 is moved outwardly the turning of the shaft 21 and sheaves 162 moves the cable 161 in a direction to move the upper blade 158 toward the front of the machine and the lower blade 159 toward the rear of the machine to the positions shown in Figs. 1 and 16, thus acting on the engaged portion of the belt to unwind a quantity thereof from the front roll. Upon the upstroke of the blade 15, the blades 158 and 159 assume their normal positions thus leaving sufficient slack in the belt to permit it to pass at least once around the winding roll before such slack is taken up and strain is applied to the belt to unwind it from the other roll. In order to prevent a free unwinding of the forward roll 8 a spring 166 is secured to the front of the case 1 and acts on one of the disks 8ᵃ of such roll to frictionally resist a turning of the same.

The operation of my apparatus is as follows:—When all of the pieces on the upper half of the belt A have been played due to the transfer of the belt from the forward roll 8 to the rear or winding roll, the loop $a$ which is engaged by the jaws of the forward roll is drawn from engagement therewith thus rendering the belt loose between its points of engagement with the rear roll 8. At approximately the same time that the loop $a$ is released from the forward roll an aperture in the belt moves into register with a passage of the mouth-piece 5 which is in communication with the bellows 38, thus creating an air suction within the bellows and a consequent collapse of the same. The collapsing or closing movement of the bellows imparts a downward pull to the rod 37 and throws the shift lever 36 inwardly whereby to move the shift-bar 32 to release its locking engagement with the frame 9 and to throw the gear 29 into engagement with its clutch member 30 (see Fig. 4). As rotation is communicated to the gear 29 from the shaft 22 through the medium of the worm 24 and gears 25 and 26, the gear 29 when engaged with the clutch member 30, which is fixed to the shaft 10, causes such shaft and the frame 9 to rotate therewith. Such rotation of the shaft 10 and frame 9 is stopped, however, when they have turned one-half around due to the pin end of the shift-bar 32 dropping into a properly positioned socket 35 in the associated frame side 9 for such purpose, the pin 32 having been released of the shifting pressure of the lever 36 due to the bellows assuming its normal filled condition upon the movement of the belt aperture from register with the bellows passage in the mouth-piece 5. The half turning of the frame 9 throws the empty roll 8 to the rear and the filled roll to the front of the machine, the loose portion of the belt during such movement passing freely over the track 6.

The shifting of the lever 36 to throw the gear 29 into engagement with its clutch also shifts the levers 142 and 143 which connect it with the wedge-bar 117 of the unit D and moves such wedge-bar inwardly to effect a release of the catch 114 from the shift-bar 109 to permit such bar to move, under the influence of its spring 111, to throw the shift gear 46 into engagement with its clutch member. Rotation is thus communicated to the shaft 21 from the drive shaft 22 through the train of gears 24, 25, 27, 39, 42, 45 and 46 in the proper direction to feed the looping-blade 15 downwardly through the medium of the pinions 20 and racks 19. When the lower edge of the blade 15 has moved approximately the distance $d\,e$ (Fig. 16) the cam $p$ on the part 145 moves into contact with the plunger P and causes an outward or retracting movement thereof against the tension of its spring 148. The movement thus imparted to the plunger P is communicated through the bar 151 and lever 152 to the wedge-bar 89 of the unit B and the wedge-bar 101 of the unit C, the bar 89 moving inwardly to effect a retraction of the spring 81 of the unit B through the levers 90 and 91, and the bar 101 moving inwardly to effect a release of the catch 99 from the shift-bar 93 of the unit C. Upon such release of the shift-bar 93 it is moved by the spring 94 to throw its pin 96 into the path of revolution of the angled end of the associated roller jaw finger 8ᶠ, and its pin 97 into thrust contact with the outer side of the associated gear 53 in the path of revolution of the socket 98 therein. When the jaw finger 8ᶠ has moved into engagement with the pin 96 and the jaw is opened to full extent thereby with its opening in register with the arc of movement of the lower edge of the looping blade 15, the socket 98 in the gear 53 will have moved into register with the pin 96 to permit said pin to drop therein and lock the gear 53 and attached roll 8 against further turning. The shift gear 54 is moved from engagement with its clutch simultaneously with the dropping of the pin 97 into its socket 98 due to the movement which is imparted to the shift-rod 78 of the unit B from the bar 93 of the unit C through the medium of the lever 106, thus breaking connection between the driving parts and the gear 53. When the lower edge of the blade 15 has entered the opening between the roller jaws and drawn the coacting portion of the belt A inwardly therewith, the cam $q$ will have moved into engagement with the plunger Q and effected an outward or retracting movement thereof. This movement of the plunger Q is communicated through the bar 153 and lever 154 to the wedge-bar 102 of the unit C, whereby to force such bar inwardly and effect a retraction of the bar 93 and attached parts against the tension of its spring 94 through the medium of the levers 103 and 104 (see Figs. 28 and 29), thus releasing the pins 96 and 97 from engagement with the jaw finger $8^f$ and gear socket 98, respectively. The gear 54, however, is not thrown into engagement with its clutch to effect a driving of the gear 53 and attached roll 8 until the plunger S is moved upon the upward movement of the blade 15, as hereinafter described. When the blade 15 has reached the limit of its down-stroke, the cam $r$ will have moved into engagement with the reversing plunger R, as shown in Figs. 16 and 28. Upon the outward or retracting movement of the plunger R the bar 155, which connects it to the wedge-bar 118 of the unit D and the wedge-bar 133 of the unit E, moves such bars inwardly to effect a retraction of the spring 111 of the unit B relative to the shift bar 109 and a disengagement of the catch 129 from the shift-bar 122 of the unit C. Upon the release of the shift-bar 122 in this manner the spring 124 acts thereon to throw it to the left against the tension of the spring 125 and to move the shift gear 45 into engagement with its clutch member, while the lever 140 which connects the shift-bars of the units D and E is moved by the bar 122 to retract the bar 109 and its gear 46 from clutch engaging position. The spring 111 having been retracted by the movement of the wedge-bar 118, there is no pressure on the shift-bar 109 resisting a retraction of the same by the lever 140. The reversing gears being now in operation, the blade 15 is moved upwardly to its normal position. During the upward movement of the blade 15 the cam $s$ is the first to act, moving into contact with the plunger S and effecting an outward or retracting movement of the same when the blade has been retracted sufficiently to free the roll 8.

The movement of the plunger S is communicated through the bar 156 and lever 157 to the wedge-bar 88 of the unit B (see Figs. 11 and 28), said wedge-bar being moved to effect a release of the catch 84 from the shift-rod 78 to permit such shift-rod to move under the influence of the spring 81 to throw the shift gear 54 into engagement with its clutch whereby to drive the gear 53 and roll 8 to wind the belt A on the latter. The outward movement of the plunger S also communicates an inward movement to the wedge-bar 137 of the unit E through the medium of the part 156 (see Figs. 12 and 28), whereby to effect a retraction of the spring 128 relative to the shift-bar 122 of such unit, so that said spring and the levers 138 and 139 assume the position shown in Fig. 12 while the bar 122 is held at the limit of its movement to the left by the engagement of the catch 131 with the member 128 on said shift-bar. When the blade 15 has reached the limit of its up-stroke, the cam $t$ will have moved into engagement with and effected a retraction of the plunger T. Upon such movement of the plunger T the bar 136, which connects it to the lever 135 of the unit E, is moved to rock said lever and the lever 134 to release the catch 131 from the part 128, thus permitting the shift-bar 122 and attached gear 45 to be moved to neutral position by the action of the spring 125, it being remembered that the spring 124 stands retracted so as not to resist the action of the spring 125. During the winding of the music belt A upon the rear roll 8 the pressure roll 61 which bears against the roll is moved outwardly by such roll as its diameter increases by the winding of the bolt thereon, and such movement is communicated to the shaft 68 through the swinging frame 62 and attached segmental racks 65, which latter in turn rotate the meshing pinions 67 and shaft 68. This rotation is communicated through the gears 70, shaft 69 and gears 71 to the pinion 72, which meshes with and moves the rack-bar 75 to the right, (see Figs. 1, 2 and 16). The movement which is thus imparted to the rack-bar 75 is communicated to the friction wheel 60 and moves it axially toward the axis of its driving disk 39, thus reducing the speed of driving of the wheel 60 and connected roll 8 in proper ratio to compensate for the gradually increasing size of the music roll. When the belt A has been transferred from the forward to the rear roll 8 the frame 9 is again given a half turn to place the filled roll 8 to the front and the empty roll to the rear, and the other automatic operations are repeated in their sequential order, as above described.

The half turning of the frame effects the transfer of the half of the belt A which on the preceding action traveled over the track 6 and under the mouth-piece 5 to inoperative position beneath the frame, whereas the half of the belt which previously had the inoperative position beneath the frame 9 passes over the track 6, and then winds upon the rear roll 8. It is thus apparent that during a transfer of the belt from one roll to the other one-half of the same passes under the mouth-piece 5 to effect a playing of the music represented thereon, and that the music on the other half of the belt is not played until the frame 9 has been turned half around and the next transference of the belt from one roll to the other occurs. It is thus evident that the playing of the music on the belt may be automatically repeated indefinitely.

It will be understood that the playing of the pieces of music which are on the belt A may be controlled by the depositing of coins within the player or in any suitable manner, as is common in instruments of this class, and also that the apparatus comprising my invention is not restricted to use in connection with any particular type or construction of automatic player, but may be used in any of such players for which it may be adapted or appropriate.

I wish it understood that the primary feature of my invention consists broadly in the provision of means for accommodating and handling an endless music belt of considerable length so that the playing of music represented thereon may be automatically repeated an indefinite number of times, and not specifically to the mechanism shown and described for accomplishing such automatic action, as numerous forms of such mechanism may be provided for accomplishing the same feature.

It will therefore be understood that my invention is not limited to the specific construction and arrangement of the parts shown and described except insofar as such limitations are specified in the claims.

Having thus described my invention, what I claim as new and desire to secure by Letters Patent, is,—

1. In combination, a set of rolls upon which a belt may wind from one to another thereof and capable of movements to reverse their positions, an endless belt, and means for engaging different portions of the belt to the rolls.

2. In combination, an endless belt, rolls capable of revoluble movements in unison about a common axis, means for engaging different portions of the belt to the rolls whereby to divide the belt into two sections which feed from one to the other of the rolls and vice versa, and a belt guide with which one section only of the belt engages at the same time.

3. In an apparatus of the class described, an endless music belt, a guide for the belt, a set of rolls revoluble about a common axis and having jaws for gripping different portions of the belt to divide the belt into two sections which wind from one to the other of the rolls with one of such sections engaging the guide.

4. In an apparatus of the class described, an endless music belt, a guide for the belt, two rolls adapted to grip different portions of the belt to divide the belt into two sections which may wind together from one to the other of said rolls with one section engaging the guide, such rolls being capable of having their positions reversed when one becomes filled and the other empty to permit a transference of the belt from the filled to the empty roll with the other section of the belt engaging the guide during such transfer.

5. In an apparatus of the class described, an endless music belt, a guide for the belt, a pair of rolls adapted to grip portions of the belt to divide the same into two substantially equal sections, the belt sections being wound on one roll when the other is empty and feeding from the filled to the empty roll, said rolls being capable of having their positions reversed whereby the belt sections from the filled roll will always feed in the same direction to the empty roll, the belt sections engaging the guide in successive but not the same feeding operation.

6. In an apparatus of the class described, an endless music belt, a guide for the belt, a roll gripping a portion of said belt and having the belt wound thereon, a second roll for gripping another portion of the belt and upon which when turned the belt sections wind from the other roll, the rolls being movable to reverse their positions whereby the feeding of the belt sections from one to the other of the rolls will always be in the same direction but reversed relative to the rolls, the belt being adapted to remain in engagement with the guide during a reversal of the position of the rolls and one belt section engaging the guide when the feed is from one roll to the other and the other belt section engaging the guide when the feed of the belt sections is reversed relative to the rolls.

7. In an apparatus of the class described, an endless belt, a guide for the belt, a rotatable frame, rolls revolubly carried by such frame and arranged on opposite sides of its axis, said rolls being capable of gripping portions of the belt to divide the same into two sections whereby such belt sections may wind from one roll to the other with one section engaging the guide and then from the second to the first roll upon a reversal of the positions of the rolls with the other belt section in engagement with the guide, the empty roll being released from the belt during the reversing movements of the rolls.

8. In an apparatus of the class described, an endless music belt, a rotatable frame, and rolls revolubly carried by the frame and adapted to engage different portions of the belt and to have the belt wind from one to the other thereof.

9. In an apparatus of the class described, an endless music belt, a rotatable frame, and rolls revolubly carried by such frame and arranged on opposite sides of its axis, said rolls being adapted to engage different portions of the belt to divide the same into two substantially equal sections and to have the belt wind from one to the other of the rolls, the empty roll being released from the belt during a movement of the frame.

10. In an apparatus of the class described, an endless music belt, a guide for such belt, a rotatable frame, means for imparting semi-rotary movements to the frame at predetermined intervals, rolls carried by the frame on opposite sides of its axis and adapted to engage different portions of the belt to divide the same into two substantially equal sections and to have such sections wind from one to the other of such rolls with one section thereof engaging the guide and upon a reversing of the positions of the rolls to wind back upon the roll from which it was previously unwound with the other section of the belt engaging the guide, the belt being released from engagement with the empty roll during a shifting of the rolls.

11. In an apparatus of the class described, an endless belt, a guide for a portion of such belt, a rotatable frame, rolls carried by such frame on opposite sides of its axis and shiftable by a semi-rotation of the frame to reverse the positions thereof, said rolls being adapted to engage different portions of the belt to divide the same into two substantially equal sections with the sections feeding from one to the other of said rolls and with one section engaging the guide during such feeding movement, mechanism operative to move the frame to reverse the positions of the rolls when the one from which the belt is unwinding becomes empty, the feeding of the belt being reversed relative to the rolls when shifted with the other section thereof engaging the guide, the belt being released from the empty roll during a shifting of the rolls.

12. In an apparatus of the class described, an endless music belt, a guide for a portion of such belt, a frame within the belt, a pair of rolls carried by said frame and shiftable by movements of the frame to reverse the positions thereof, said rolls being adapted to engage different portions of the belt to divide the same into two substantially equal sections one of which sections engages said guide when the frame is in one position and the other section engaging the guide when the frame is in reverse position, means for turning either roll when in one position of its shifting movement to wind the belt sections thereon from the other roll, the shifting movements of the rolls occurring when one roll is empty and the belt being released therefrom during such shifting movements, and means for engaging a portion of the belt with the empty roll when in shifted position.

13. In an apparatus of the class described, an endless music belt, and rolls revoluble about a common axis and adapted to engage different portions of the belt and to have the belt wind from one to the other thereof, and means operable to place a portion of the belt in engagement with a roll when at a predetermined point in a revolution thereof.

14. In an apparatus of the class described, an endless music belt, a guide for the belt, and rolls revoluble about a common axis and adapted to engage different portions of a belt to divide the same into substantially equal sections and to have such sections wind from one to the other thereof with one section engaging the guide when the rolls are in one position of their movements, and the other section engaging the guide when the rolls are in the reverse positions of their movements, the belt being released from the empty roll during a reversing of the positions of the rolls, and means operable to place a portion of the belt in engagement with the empty roll when its position is the reverse of its unwinding position.

15. In an apparatus of the class described, an endless music belt, a guide for the belt, a pair of rolls which are revoluble about a common axis to reverse the positions thereof, said rolls engaging different portions of the belt to divide the same into two substantially equal sections, the belt winding from one to the other of said rolls in alternate order but always having its unwinding movements in the same direction with one section thereof engaging the guide when unwinding from one roll and the other section thereof engaging the guide when unwinding from the other roll, the belt being released from the empty roll during the reversing movements of the rolls, and means for placing the belt in engagement with the empty roll when in winding position.

16. In an apparatus of the class described, an endless music belt, a pair of rolls mounted for revoluble movements about a common axis to reverse their positions, said rolls being adapted to engage different portions of the belt to divide the same into two substantially equal sections with the sections winding from one to the other of the rolls and then reversing, means for reversing the positions of the rolls, the belt being released from the empty roll during such reversal, means for engaging the belt to the empty roll when in one position of its movement, and a guide with which one section of the belt engages during the feeding of the belt from one roll to the other and with which the other section engages during the reverse feeding of the belt.

17. In an apparatus of the class described, an endless belt, a mouth-piece with which it coacts, a set of spaced rolls capable of movements to reverse their positions, said rolls being adapted to engage different portions of the belt to divide the same into two substantially equal sections which feed alternately from one to the other of said rolls but always in the same direction, the empty roll being released from the belt during a reversal of the positions of the rolls, means for engaging the belt with the empty roll when it has been placed in reverse position to its unwinding position, one section of the belt coacting with the mouth-piece during the feeding of the belt from one roll to the other and the other section coacting with the mouth-piece during a reverse feeding of the belt.

18. In an apparatus of the class described, an endless belt, a rotatable frame within the belt, a pair of rolls carried by the frame on opposite sides of its axis and adapted to engage different portions of the belt to divide the same into two sections which wind together from one roll to the other and vice versa, means for moving the frame to reverse the positions of the rolls when one has been emptied, the belt being released from the emptied roll during such reversal, means for engaging the belt to the empty roll when in winding position, and a mouth-piece with which one section of the belt coacts when winding from one roll to the other and with which the other section coacts when the winding is reversed relative to the rolls.

19. In an apparatus of the class described, an endless belt, a frame rotatable within said belt, rolls carried by the frame at opposite sides of its axis and adapted to grip different portions of the belt to divide the same into two sections which wind from one roll to the other when the rolls are in one position and vice versa when the rolls are in reverse position, a mouth-piece with which one belt section coacts when the winding is in one direction relative to the rolls and with which the other section coacts when the winding is in the other direction relative to the rolls, mechanism automatically operative to reverse the positions of the rolls when either becomes empty, the belt being released from the empty roll during its reversing movement, and means movable to place the belt in engagement with the empty roll when in winding position.

20. In an apparatus of the class described, an endless belt, a pair of spaced rolls within the belt and movable to reverse their positions, said rolls being capable of gripping associated portions of the belt to divide the same into sections, which when gripped wind from one roll to the other and vice versa, means for driving each roll when in one position of its movement, a mouth-piece with which one section of the belt coacts when the sections are winding on one roll and with which the other belt section coacts when the sections are winding on the other roll, mechanism automatically operative to move the rolls to reverse their positions when either roll has become emptied, the belt being released from the empty roll during the reversing movements of the rolls, and means automatically operative to place a portion of the belt in engagement with the empty roll when in winding position.

21. In an apparatus of the class described, an endless belt, a pair of rolls within such belt adapted to engage different portions of the belt to divide the same into sections and upon which such sections alternately wind one from the other, mechanism for moving the rolls to reverse their positions, means for imparting winding movements to each roll when in one position of its movement, a guide with which one section of the belt coacts when winding upon one roll and with which the other section coacts when winding upon the other roll, means for placing a portion of the belt in engagement with an empty roll when in winding position, and means which is automatically operative to reduce the speed of driving of the winding roll as the diameter of the same increases by a winding of the belt thereon.

22. In an apparatus of the class described, an endless belt, rolls for gripping different portions of the belt and upon which the belt winds from one to the other and vice versa, means for moving the rolls to reverse their positions when either becomes empty, the belt being released from a roll when empty, means for engaging a portion of the belt to an empty roll when in winding position, means for driving each roll when in one position of its movement, and means automatically operative by the roll as it increases in size upon a winding of the belt thereon to reduce the speed of driving of such roll.

23. In an apparatus of the class described, an endless belt, a set of rolls disposed within the belt and each having jaws for gripping portions of the belt thereto, means of reversing the positions of the rolls when the belt has wound from one to the other thereof, and means for placing a portion of the belt in engagement with the empty roll when in winding position.

24. In an apparatus of the class described, an endless belt, a pair of belt gripping and winding rolls disposed therein and revoluble to reverse their positions, the belt being adapted to wind from one to the other of the rolls when in one position and vice versa when shifted, and means for placing a portion of the belt in engagement with each empty roll when at a predetermined point in a revolution thereof.

25. In an apparatus of the class described, an endless belt, a pair of revoluble rolls disposed within the belt and each having a jaw for gripping a portion of the belt thereto, and mechanism having a blade which is automatically movable to place a portion of the belt in engagement with an empty roll when at a predetermined point in a revolution thereof.

26. In an apparatus of the class described, an endless belt, a frame, a pair of belt gripping rolls carried by the frame within the belt, the belt winding from one to the other of said rolls and vice versa when both rolls are engaged thereto, said frame being movable to reverse the positions of the rolls, and mechanism having a part which is automatically operative to place a portion of the belt in engagement with each empty roll when in one position of its movement.

27. In an apparatus of the class described, an endless belt, a rotatable frame disposed within the belt, rolls carried by said frame upon opposite sides of its axis and having jaws for gripping looped portions of the belt, the belt winding from one to the other of the rolls when in one position and vice versa when in reverse positions, and mechanism automatically movable to loop a portion of the belt within each roll when empty and at a predetermined point in its movement.

28. In an apparatus of the class described, an endless belt, a set of belt gripping rolls disposed within the belt and upon which the belt winds from one to the other and vice versa, said rolls being movable to reverse their positions, mechanism for engaging a portion of the belt with each roll when empty and at a predetermined point in its movement, and means automatically operative during the operation of said mechanism to slacken the belt to permit its engagement with a roll.

29. In an apparatus of the class described, an endless belt, a set of belt gripping rolls located within the belt and movable to reverse their positions, the belt winding from one to the other of the rolls when in one position and vice versa when the rolls are in reverse position, a blade automatically movable to place a portion of the belt in engagement with an empty roll when in one position of its movement, and means automatically operative to slacken the belt to permit its engagement with the roll.

30. In an apparatus of the class described, an endless belt, a set of belt gripping rolls located within the belt and movable to reverse their positions, said belt being adapted to wind from one to the other of said rolls when in one position and vice versa when in reverse position, means automatically operative to move the rolls to reverse their positions when the belt has been unwound from one, means for driving each roll when in one position of its movement to wind the belt thereon, mechanism having a part automatically movable to place a portion of the belt in engagement with the empty roll when in winding position, and mechanism operative by said part when in one position of its movement to stop the winding of the empty roll until the belt has been engaged therewith.

31. In an apparatus of the class described, an endless belt, a set of rolls located within the belt and adapted to grip portions thereof and revoluble about a common axis to reverse their positions, the belt winding from one to the other of said rolls when in one position and vice versa when in reverse positions, means for driving each roll when at one position of its movement to wind the belt thereon from the other roll, means automatically operative to revolve the rolls to reverse their positions when the belt has been entirely unwound from one roll, mechanism having a part movable to place a portion of the belt in engagement with an empty roll when in one position of its movement, means coacting with said mechanism for controlling the movements thereof, and means coacting with said part to control the driving of the winding roll.

32. In an apparatus of the class described, a belt, a set of rolls adapted to grip such belt at different points to divide the same into sections, said rolls being movable to reverse their positions, and means operative to tighten or slacken one section when the rolls are in one position or to tighten or slacken the other section when the position of the rolls is reversed.

33. In an apparatus of the class described, a belt, a roll upon which such belt winds, said roll being adapted to grip the belt, mechanism operative to place a portion of the belt in engagement with said roll, means operative by movements of said mechanism to effect a slackening of the belt during an engaging of the same with the roll.

34. In an apparatus of the class described, a belt, a roll upon which said belt may wind, said roll having a jaw movable to receive and grip a portion of the belt to the roll, means operative to open said jaw, and means operative to place a portion of the belt in engagement therewith, the jaw opening means releasing the same when the belt engaging means has retracted from belt engaging position.

35. In an apparatus of the class described, a belt, a roll having a jaw for gripping a portion of the belt thereto, mechanism for driving the roll to wind the engaged belt thereon, mechanism for stopping the winding movement of the roll and opening its belt gripping jaw, and means operative to place a portion of the belt in engagement with such jaw and then to retract from such position, the mechanism which opens the jaw and stops the driving of the roll being operative to release the jaw and permit a driving of the roll at predetermined points in a movement of said means.

In testimony whereof, I have hereunto signed my name to this specification in the presence of two subscribing witnesses.

PHILLIP JACOB DREHER.

Witnesses:
C. W. OWEN,
M. G. GASKELL.

Copies of this patent may be obtained for five cents each, by addressing the "Commissioner of Patents, Washington, D. C."